(12) United States Patent
Sahm et al.

(10) Patent No.: US 6,931,972 B2
(45) Date of Patent: Aug. 23, 2005

(54) TOOL REVOLVER

(75) Inventors: Detlef Sahm, Lichtenwald (DE); Edgar Kirsch, Metzingen (DE); Peter Quass, Metzingen (DE)

(73) Assignee: Sauter Feinmechanik GmbH, Metzingen (DE)

( * ) Notice: Subject to any disclaimer, the term of this patent is extended or adjusted under 35 U.S.C. 154(b) by 423 days.

(21) Appl. No.: 10/258,287

(22) PCT Filed: Apr. 12, 2001

(86) PCT No.: PCT/EP01/04225

§ 371 (c)(1),
(2), (4) Date: Oct. 23, 2002

(87) PCT Pub. No.: WO01/83162

PCT Pub. Date: Nov. 8, 2001

(65) Prior Publication Data

US 2003/0140472 A1 Jul. 31, 2003

(30) Foreign Application Priority Data

Apr. 27, 2000 (DE) ........................................ 100 20 605

(51) Int. Cl.[7] .............................................. B23B 29/32
(52) U.S. Cl. .............................. 82/121; 82/131; 82/159; 29/40
(58) Field of Search ........................... 82/121, 129, 131, 82/142, 148, 157, 158, 159; 29/35.5, 40, 36, 50

(56) References Cited

U.S. PATENT DOCUMENTS 3,999,264 A    12/1976  Carmen .................... 29/48.5 R
4,872,244 A  * 10/1989  Schleich ........................ 29/40
4,972,744 A  * 11/1990  Sauter et al. .................. 82/159
5,632,075 A     5/1997  De Bernardi et al. ........... 29/40
5,657,523 A     8/1997  Lin et al. .................. 29/48.5 R

FOREIGN PATENT DOCUMENTS

DE          3814595             1/1989
DE          4139543             10/1992
DE          19940330 A1  *      3/2001  ........... B23B/29/12
EP          0514626             11/1992

* cited by examiner

Primary Examiner—Willmon Fridie, Jr.
(74) Attorney, Agent, or Firm—Roylance, Abrams, Berdo & Goodman, LLP

(57) ABSTRACT

The invention relates to a tool revolver comprising a revolver head (12) which is supported by a housing (20) and which can be rotated in relation to said housing (20) by means of at least one axial bearing (24). The axial bearing (24) is mounted in between the revolver head (12) and the housing (20) in the direction of the revolver head (12) by means of a locking member (32). The hydraulic medium producing the fluidic pressure can be placed in between the locking member (32) and a connecting element (38). The connecting element (38) engages with the locking member (32) from below in such a way that the axial bearing (24) is subject to pressure when the revolver head (12) is in a locked or unlocked state. Consequently, all major functions are brought together in a minimum amount of construction space, requiring only a minimum amount of components. The influence of the cutting force on the revolver head which can otherwise have a negative effect on machining accuracy, especially when rear side machining occurs, is thereby avoided.

8 Claims, 2 Drawing Sheets

TOOL REVOLVER

Figure 1:
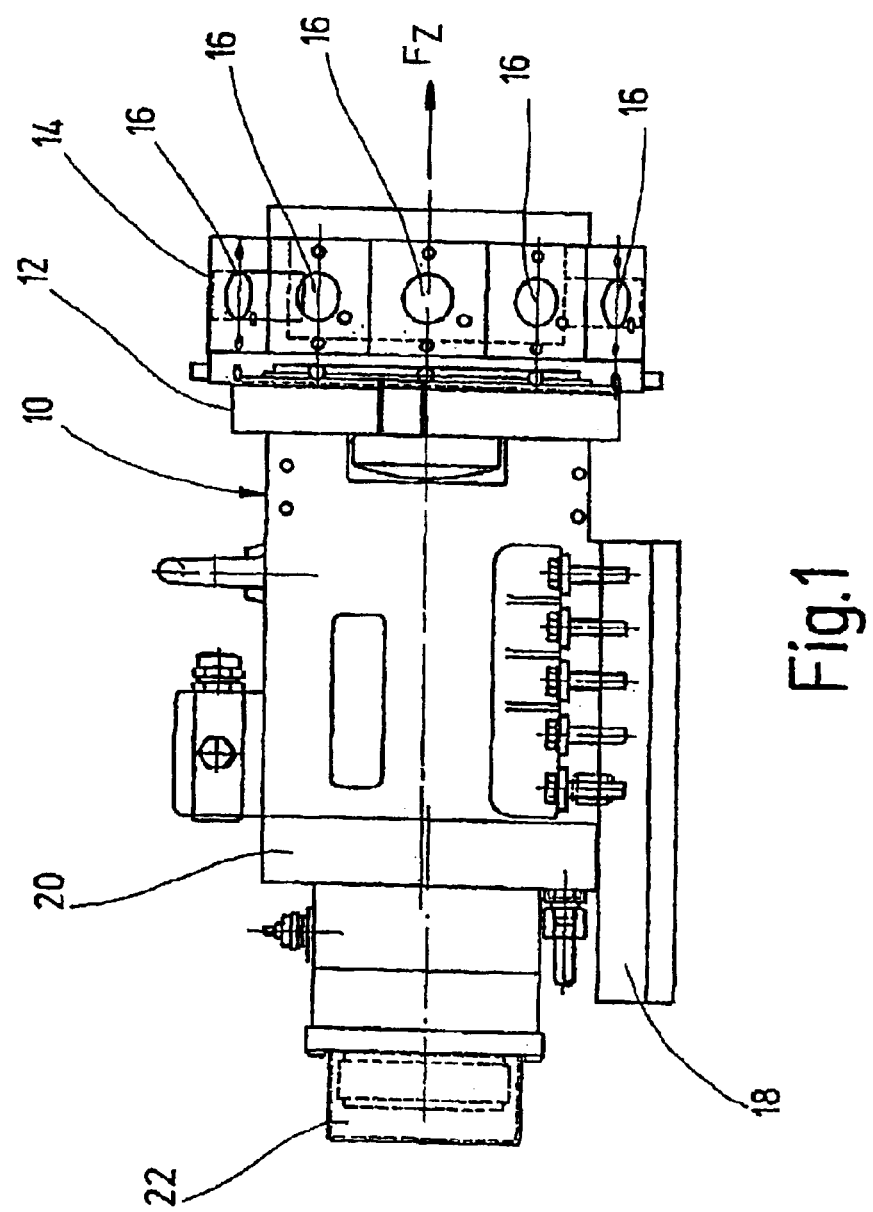

The invention relates to a tool revolver with a turret head supported by a housing and rotatable relative to this housing by way of at least one axial bearing, such turret head having, on the side facing the interior of the housing, a gear rim concentric with its axis of rotation, with teeth extending radially and aligned in optional rotary positions of the turret head with the teeth of the gear rim, and with a locking element movable in the direction of the axis of rotation of the turret head by the pressure of a fluid, with a gear rim whose radial teeth in the locked position engage both the gear rim of the turret head and the gear rim of the housing with the force produced by the pressure of the fluid, the hydraulic pressure simultaneously applying a load to the turret head by way of a connecting element in the form of an axial bearing pressure which acts in the direction opposite the axial force exerted by the locking force on the gear rim of the turret head.

With tool turrets such as are disclosed in DE 38 14 595 A1, for example, the danger exists that the accuracy of positioning the turret head may be reduced, especially if the tool turret is used on a so-called counterspindle lathe and, when a blank held by the counterspindle is machined, a cutting force load is applied to the turret head which acts in the direction of raising of the turret head and is greater than the difference between the force exerted by the piston forming or actuating the locking element by way of the gear rim of the turret head on the latter and the force of reaction acting on the turret head in the direction opposite this force. If in this instance the axial forces of the bearing receiving the turret head have a certain amount of play, the position of the turret head may be modified, something which results in corresponding inaccuracies in machining of blanks.

In order to eliminate in the simplest possible manner an influence of the cutting force load exerted on the turret head in so-called reverse side machining, in the case of a generic tool turret as claimed in DE 41 39 543 C1 it has already been proposed that use be made of an additional piston movable hydraulically relative to the housing, a piston which applies a force to the turret head in its locked state, a force acting in the same direction as the reaction force, the value selected for the force which may be generated by means of the piston needing to be constantly larger than the forces acting in the direction of the cutting force load. The conventional solution for this purpose, which yields very good machining accuracies, is nevertheless complex because of the high number of parts alone, while the load relief piston claimed occupies a large amount of structural space. In addition, the locking element movable by hydraulic means relative to the housing has to be hydraulically actuated, this raising the cost of providing hydraulic means.

On the basis of this state of the art the object of the invention is to develop the conventional generic solution further in such a way that a negative effect of the turret head, especially in so-called reverse side machining, is eliminated by a method which is still simplified, with the smallest possible number of components and with saving of structural space. This object is attained by means of a tool turret possessing the characteristics specified in claim 1.

Since, as specified in the descriptive portion of claim 1, the axial bearing between turret head and housing in the direction of the turret head is mounted upstream from the locking element, the hydraulic medium generating the fluid pressure may be introduced between the locking element and the connecting element, and the connecting element engages the locking element from below in such a way that the axial bearing is subjected to application of pressure with the turret head both locked and unlocked; all important functions are concentrated in the smallest structural space involving few components and in this way eliminate a harmful effect exerted by the application of a cutting force to the turret head, especially in so-called reverse side machining. Since the hydraulic medium engages both the locking element and the connecting element for a process of locking the gear rims to each other directly, the turret head is drawn by way of the connecting element against the action of the locking element and in this way applies a load to the axial bearing between turret head and housing.

If the locking is released for a rotary movement of the turret head, in particular through application of another hydraulic fluid pressure now in the area of the locking gears, and if the fluid space between the locking element and connecting element is kept free of pressure, a "pulling load" on the axial bearing is in turn achieved, so that the turret head with the connecting element is subjected to a force component by way of the forthcoming fluid pressure, in the direction of the housing, and so the axial bearing, in particular in the form of a needle bearing, is subjected to pressure. Hence, in any event the axial bearing between turret head and housing is subjected to a force of pressure "by pulling" between turret head and housing so that all the stresses arising can be absorbed with only one axial bearing. In contrast to a multiple-bearing layout this is distinctly cost-effective and maintenance-friendly. In particular, in the event of any failure the axial bearing may be simply replaced, since the axial bearing is for ease of assembly mounted directly between turret head and housing on the front of the tool turret.

In a preferred embodiment of the tool turret claimed for the invention, the connecting element has, parallel to the direction of displacement of the locking element, a contact surface for contact with the locking element in every position to which the latter is displaced. As a result, the locking element is supported over its entire potential path of displacement, on one side by the housing and on the other by the connecting element.

In another preferred embodiment of the tool turret claimed for the invention, the connecting element operates in conjunction with a drive element to produce the rotary movement of the tool turret; this drive element may be powered by a drive mounted in the housing. Space may be conserved especially by providing a worm gearing drive.

In another preferred embodiment of the tool turret claimed for the invention a radial bearing is mounted between the housing components with the gear rim and the components of the turret head, these components of the turret head at least to some extent covering the connecting element. For one thing this achieves reliable support of the turret head on the connecting element, and for another ready accessibility makes installation of the radial bearing required for the rotary movement of the turret head quicker.

Advantageous developments are described in the other dependent claims.

The invention is explained in detail in what follows on the basis of an embodiment illustrated in the drawing.

Figure 2:
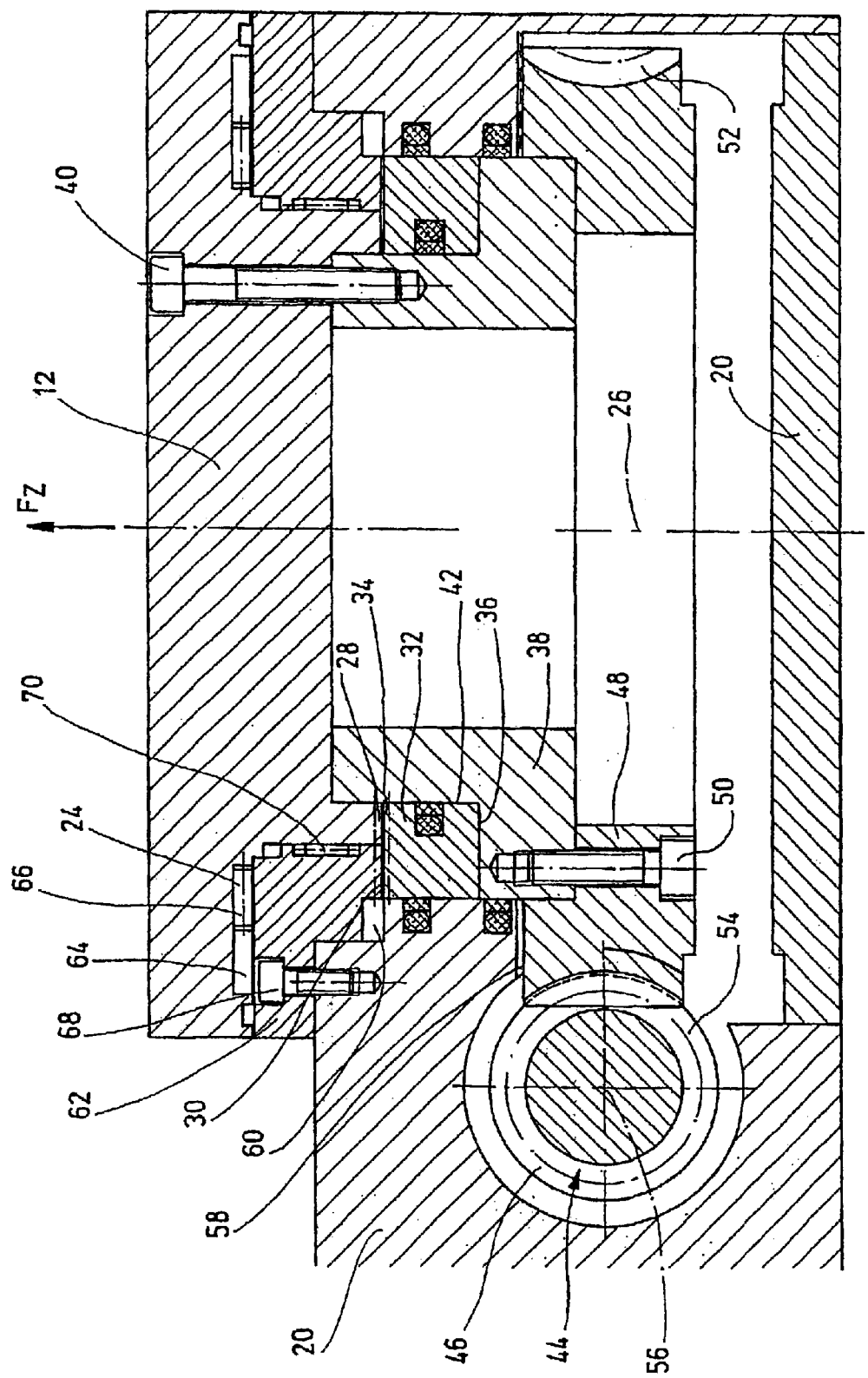

FIG. 1 presents a diagrammatic view of the exemplary embodiment;

FIG. 2 an incomplete longitudinal section through the exemplary embodiment.

A tool turret identified as a whole as 10, which, to the extent that it is used in a counterspindle lathe application, would also be suitable for so-called reverse side machining, has a turret head 12 on which a tool disk 14 is detachably fastened by conventional means; a tool disk rated at least for mounting of a cutter module (not shown) is provided with suitable mounting openings 16. A tool module as thus described may also be used to effect so-called reverse-side machining of a blank (not shown) of a machine tool (not shown) supported by a counter-spindle. The cutting force load which arises in reverse-side machining in particular is indicated in FIG. 1 by the arrow FZ. The tool turret 10 in addition has a housing 20 to be mounted permanently, for example, on a slide 18 of the counterspindle lathe. An electric motor 22, preferably one in the form of a servomotor or the like, is used to drive the turret head 12.

For the sake of clarity the tool disk 14 is omitted from FIG. 2 and only the turret head 12 connected to it is shown. The turret head 12 is guided so as to be rotatable by way of an axial bearing 24 relative to the housing 20. On its side facing the interior of the housing the turret head 12 has a gear rim 28 concentric with the axis of rotation 26 of the tool disk 14 with gears extending radially, which are in alignment in optional rotary positions of the turret head 12, which is rigidly connected to the tool disk 14, with the gears of a gear rim 30 of the housing 20. In addition, the tool turret 10 has in the direction of the axis of rotation 26 of the turret head 12 a locking element 32 movable under fluid pressure, with a gear rim 34. Under the influence of the fluid pressure in the locked position the radially mounted gears of the gear rim 34 generate a locking force and engage both the gear rim 28 of the turret head 12 and the gear rim 30 of the housing 20. The layout in the unlocked position is illustrated in FIG. 2 and the gears as seen in the direction of FIG. 2 are indicated by broken lines, in the left half of the illustration only. The locking layout employed for the purpose is otherwise embodied in so-called Hirth serrations, as disclosed earlier in DE 41 39 543 C1, so that it will not be discussed at length at this point.

To execute a locking process to secure the turret head 12 in assignable rotary positions along its axis of rotation 26, a pressurized hydraulic medium is introduced into the toroidal chamber 36 by way of a delivery line not shown; the fluid pressure present in the line displaces the locking element 32 as viewed in the direction of FIG. 2 from its lower position as indicated to a high position not shown, in which the gear sets referred to are meshed with each other. The pressure of the fluid present in the toroidal chamber 36 acts, however, not only upward and so on the gears referred to, but also in the opposite direction toward a reactive force on a connecting component 38 which is rigidly connected to the turret head 12 by way of a screw connection 40.

The axial reaction force in question, which counteracts the axial force exerted by way of the locking element 32 on the gear rims 28, 30, and 34, presses the turret head 12 against the force FZ in the opposite direction downward and so applies a load to the axial bearing 24 in the form of a corresponding pressure force. In addition, the toroidal chamber 36 (indicated only by a broken line) is bounded by the adjacent front sides of locking element 32 and connecting component 38. In addition, the connecting component 38 has, parallel to the direction of displacement of the locking element 32 along the axis of rotation 26, an annular contact surface 42 for contact with the locking element 32 in each displaced position.

The connecting component 38 operates for the purpose of rotary movement of the turret head 12 in conjunction with a driven element designated as a whole as 44 which is actuatable by a drive 22,46 mounted in the housing 20. The driven element 44 has a drive ring 48 rigidly connected to the connecting component 38, the rigid connection in question being effected by way of a screw connection 50. The drive ring 48 used for the purpose is provided on the side of the external circumference with a gear 52 which meshes with the drive gear 54 of the drive 46 in the housing 20. By preference the drive 46, as shown in FIG. 2, has a worm gear which, actuatable by its drive gear 54 in a drive shaft 56 perpendicular to the axis of rotation 26 of the turret head 12, meshes with the corresponding worm gear of the drive ring 48.

The drive ring 48, which is in the form of a step ring and, in order not to hamper the power absorption movement between the movable components, is spaced a certain axial distance 58 along its upper side from the housing 20. In addition the step of the drive ring 48 encompasses the lower side of the connecting component 38. Accordingly, the drive ring 48 is made by the screw connection 50 a stationary component of the connecting element 38 and the meshing gear components of the worm drive allow slight displacement play in the direction of the axis of rotation 26 in order to permit absorption of the "pulling" supporting forces for the axial bearing 24 without thereby creating obstacles in the form of stationary housing components 20 or gearing elements of the drive 46. Additional fluid pressure may be applied to the locking element 32 on its side with the gear 34 in order to release its position locking the turret head 12. For this purpose the gear 34 of the locking element 32 has, in the direction of the bearing 24, an additional toroidal chamber 60 into which a pressurized hydraulic medium may be introduced by way of a delivery line (not shown).

If the first toroidal chamber 36 has been kept free of pressure, the locking element 32 is pressed downward in the direction of the first toroidal chamber 36, as seen in the line of sight to FIG. 2, under the pressure of fluid in the other toroidal chamber 60. The gear rim 30 is removed from active engagement with the gear rim 34 and the turret head 12 may move around its axis of rotation 26 into an assignable position. The fluid pressure exerted in the other toroidal chamber 60 forces the locking element 32 in the direction of the connecting element 38 and applies a force to the connecting element 38 such that exclusively the axial bearing 24 has a pressure force applied to it even in the unlocking position.

Consequently, in both the locked and unlocked positions a pressure force between turret head 12 and stationary housing elements 62 of the housing 60 is applied to the axial bearing 24. Hence all relevant pressure forces acting against the cutting force FZ may be absorbed with only one axial bearing 66, preferably one in the form of a needle bearing mounted in an interior recess 64 in the turret head 12 opening toward the top side of the stationary housing elements 62. Additional axial bearings may accordingly be dispensed with, so that the assembly in question may be very cost effectively produced. Moreover, the axial bearing 24 integrated into the turret head 12 may be very easily accessed from the exterior after loosening of the screw connection 40, so that maintenance operations may be carried out quickly and simply, especially if the needle bearing 66 is worn and needs to be replaced.

The stationary housing elements 62 are fastened to the housing 20 by way of an additional screw connection 68 and encompass a stepped edge of the housing 30 like an angle plate. In addition, the stationary housing elements 62 have, on their lower side as seen in the line of sight to FIG. 2, gearing in the form of the gear rim 30 and, together with the remainder of the housing 20, at least to some extent delimit the other toroidal chamber 60. In addition, a radial bearing 70 is mounted between the housing elements 62 and parts of the turret head 12, the parts in question of the turret head 12 at least in part overlapping the connecting element 38 on the side and in this way forming a contact guide surface. The stresses arising in the rotating motion of the turret head 12 may be absorbed by conventional means by way of the radial bearing 70. In other respects, as is clearly to be seen in FIG. 2, especially along the line of sight along the axis of rotation 26, the tool turret assembly is very compact in structure, so that the turret head assembly saves space as installed on tool turrets 10.

The tooth height selected for the gear rim 28 of the turret head 12 may be somewhat greater than that of the associated gearing of the gear rim of 30 of the housing 20. Despite this difference in tooth height, the gears mesh reliably in the locked position. However, if the locking element 32 is disengaged, for example, as a result of unintentional collision, the gears on the turret head side remain meshed and unlocking occurs only with respect to the gearing on the housing 30 side. Consequently, the turret head can rotate freely and entrains the locking element 32 as a towing connection by way of the gear rims 28 and 34, which remain meshed. Hence, after such torsion resulting from collision, further machining requires only that the turret head 12 be rotated back to the original position by means of the drive motor 22 with the data of a rotary position indicator, for example, being taken into account, since the position of the turret head 12 relative to the locking element 32 has not changed. As a result of application of the solution claimed for the invention, the bearing 24 is pressurized at all times, irrespective of which of the pressure chambers 60 or 36 is subjected to the pressure of a fluid.

What is claimed is:

1. A tool turret with a turret head (12) supported by a housing (20) and rotatable relative to this housing (20) by way of at least one axial bearing (24), which turret head (12) has on the side facing the interior of the housing a gear rim (29) concentric by its axis of rotation (26) with gears extending radially which are in alignment with the teeth of a gear rim (30) in optional rotary positions of the turret head (12) of the housing (20), and with a gear rim (34) movable by means of a locking element (32) under fluid pressure in the direction of the axis of rotation (26) of the turret head (12), the radial teeth of which gear rim (34) mesh in the locking position under the force generated by way of the fluid pressure both with the gear rim (28) of the turret head (12) and with the gear rim (30) of the housing (20), the hydraulic pressure simultaneously applying to the turret head (12), by way of a connecting element (38), an axial reaction force which is opposite the axial force exerted by the locking element (32) on the gear rim (28) of the turret head (12), characterized in that the axial bearing (24) is mounted between turret head (12) and housing (20) in the direction of the turret head (12) upstream from the locking element (32), in that the hydraulic medium generating the fluid pressure may be introduced between the locking element (32) and the connecting element (38), and in that the connecting element (38) engages the locking element (32) from below in such a way that the axial bearing (24) is subjected to a pressure load when the turret head (12) is in both the locked and the unlocked state.

2. The tool turret as claimed in claim 1, wherein the connecting element (38) has, parallel to the direction of displacement of the locking element (32), a contact surface (42) for contact with the locking element (32) in every displacement position of the latter.

3. The tool turret as claimed in claim 1, wherein the connecting element (38) operates for the purpose of rotary movement of the turret head (12) in conjunction with a driven element (44) which may be actuated by a drive (46) mounted in the housing (46).

4. The tool turret as claimed in claim 3, wherein the driven element (44) has a drive ring (48) rigidly connected to the connecting element (38), such drive ring (48) being provided on the external circumference side with gearing (52) which meshes with the drive gearing (54) of the drive (46) in the housing (20).

5. The tool turret as claimed in claim 4, wherein the drive has a worm gear which meshes by its drive gearing (54) actuatably on a drive shaft (56) perpendicular to the axis of rotation (26) of the turret head (12) with the corresponding gearing (52) of the drive ring (48).

6. The tool turret as claimed in claim 1, wherein the locking element (32), for the purpose of release of its position locking the turret head (12), may have an additional fluid pressure applied to its side supporting the gearing (34) and wherein the fluid pressure applied to the opposite side of the locking element (32) is simultaneously removed.

7. The tool turret as claimed in claim 1, wherein the axial bearing (24) having an axial needle bearing (66) is positioned between turret head (12) and housing component (62), which have the gear rim (30).

8. The tool turret as claimed in claim 7, wherein a radial bearing (70) is mounted between the housing components (62) with the gear rim (30) and components of the turret head (12) and wherein these components of the turret head (12) at least partly encompass the connecting element (38).

* * * * *